US012747148B2

(12) United States Patent
Kato et al.

(10) Patent No.: US 12,747,148 B2
(45) Date of Patent: Sep. 29, 2026

(54) UNLOADING CONTROL DEVICE

(71) Applicants: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP)

(72) Inventors: Takuro Kato, Tsukuba (JP); Mitsuharu Morisawa, Tsukuba (JP)

(73) Assignees: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 240 days.

(21) Appl. No.: 18/787,299

(22) Filed: Jul. 29, 2024

(65) Prior Publication Data

US 2025/0066172 A1 Feb. 27, 2025

(30) Foreign Application Priority Data

Jul. 31, 2023 (JP) ................................ 2023-124651

(51) Int. Cl.
*B66F 9/24* (2006.01)
*B66F 9/075* (2006.01)

(52) U.S. Cl.
CPC .............. *B66F 9/24* (2013.01); *B66F 9/0755* (2013.01)

(58) Field of Classification Search
CPC ................................ B66F 9/24; B66F 9/0755
See application file for complete search history.

(56) References Cited

U.S. PATENT DOCUMENTS

| | | | | |
|---|---|---|---|---|
| 5,131,801 | A * | 7/1992 | Melanson | B66F 9/082 33/366.26 |
| 12,351,441 | B2 * | 7/2025 | Kato | B66F 9/24 |
| 12,454,448 | B2 * | 10/2025 | Shigemasa | B66F 9/0755 |
| 2003/0156934 | A1 * | 8/2003 | Fujita | B66F 17/003 414/618 |

(Continued)

FOREIGN PATENT DOCUMENTS

| | | | |
|---|---|---|---|
| JP | 2005-008367 | A | 1/2005 |
| JP | 2017-019595 | A | 1/2017 |

(Continued)

*Primary Examiner* — Gertrude Arthur Jeanglaude
(74) *Attorney, Agent, or Firm* — Sughrue Mion, PLLC

(57) ABSTRACT

Provided is an unloading control device includes a determination unit configured to determine whether or not the pallet held by the forks abuts on an upper surface of the loading portion based on the change amount of the posture of the pallet with respect to the forks estimated by the change amount estimation unit, a tilting control unit configured to control a tilt cylinder of the forklift so that the forks tilt in a direction approaching parallel to a main surface of the pallet when the determination unit determines that the pallet held by the forks abuts on an upper surface of the loading portion, and a withdrawing control unit configured to control the forklift so as to remove the forks from the pallet according to the tilt angle of the forks detected by the tilt angle detector after the forks approach parallel to the main surface of the pallet.

6 Claims, 11 Drawing Sheets

(56) References Cited

U.S. PATENT DOCUMENTS

| | | | | |
|---|---|---|---|---|
| 2018/0089616 | A1* | 3/2018 | Jacobus | G05D 1/0274 |
| 2020/0002143 | A1* | 1/2020 | Hasegawa | B66F 9/063 |
| 2021/0271246 | A1* | 9/2021 | Takao | G05D 1/0094 |
| 2022/0189055 | A1* | 6/2022 | Kita | B66F 9/0755 |

FOREIGN PATENT DOCUMENTS

| | | | |
|---|---|---|---|
| JP | 6436553 | B1 | 12/2018 |
| SE | 2350058 | A1 | 8/2023 |

* cited by examiner

UNLOADING CONTROL DEVICE

CROSS REFERENCE TO RELATED APPLICATIONS

This application claims priority to Japanese Patent Application No. 2023-124651 filed on Jul. 31, 2023, the entire contents of which are incorporated by reference herein.

TECHNICAL FIELD

The present invention relates to an unloading control device.

BACKGROUND

For example, Japanese Patent No. 6436553 describes a technique of taking out a cargo by raising a claw portion of a forklift in a state where the claw portion is inserted into a pallet, then conveying the cargo by the forklift, and unloading the cargo onto a cargo bed of a truck for conveyance.

SUMMARY

For example, a cargo bed of a truck equipped with a suspension may be inclined in a pitch direction from a forklift. In a case where unloading is performed on a loading portion such as a cargo bed having such an inclination, forks are easily caught on the inner wall surface of the pallet when the forks are removed from the pallet.

An object of the present invention is to provide an unloading control device capable of smoothly removing the forks from a pallet in a case of unloading a cargo from a loading portion inclined in a pitch direction.

(1) An aspect of the present invention is an unloading control device for loading a pallet held by forks of a forklift onto a loading portion to remove the forks from the pallet, the unloading control device includes a pallet detection unit configured to detect the pallet held by the forks and acquire detection data of the pallet, a tilt angle detector configured to detect a tilt angle of the forks, a lowering control unit configured to control a lift cylinder of the forklift so as to lower the forks holding the pallet toward the loading portion, a change amount estimation unit configured to estimate a change amount of a posture of the pallet with respect to the forks based on the detection data of the pallet acquired by the pallet detection unit and the tilt angle of the forks detected by the tilt angle detector when the forks holding the pallet are lowered, a determination unit configured to determine whether or not the pallet held by the forks abuts on an upper surface of the loading portion based on the change amount of the posture of the pallet with respect to the forks estimated by the change amount estimation unit, a tilting control unit configured to control a tilt cylinder of the forklift so that the forks tilt in a direction approaching parallel to a main surface of the pallet when the determination unit determines that the pallet held by the forks abuts on an upper surface of the loading portion, and a withdrawing control unit configured to control the forklift so as to remove the forks from the pallet according to the tilt angle of the forks detected by the tilt angle detector after the forks approach parallel to the main surface of the pallet.

In such an unloading control device, in a case of unloading the cargo from the loading portion, the lift cylinder is controlled so that the forks holding the pallet lowers toward the loading portion. At this time, the pallet held by the forks is detected, the tilt angle of the forks is detected, and the amount of change in the posture of the pallet with respect to the forks is estimated. Then, it is determined whether or not the pallet held by the forks abuts on the upper surface of the loading portion based on the amount of change in the posture of the pallet with respect to the forks. When the pallet abuts on the upper surface of the loading portion inclined in the pitch direction, the posture of the pallet with respect to the forks changes. Therefore, from the amount of change in the posture of the pallet with respect to the forks, it can be seen whether the pallet has abutted on the upper surface of the loading portion inclined in the pitch direction. Then, when it is determined that the pallet held by the forks abuts on the upper surface of the loading portion, the tilt cylinder is controlled so that the forks tilts in a direction approaching parallel to the main surface of the pallet. Thereafter, the forklift is controlled to remove the forks from the pallet according to the tilt angle of the forks. Here, when the pallet abuts on the upper surface of the loading portion inclined in the pitch direction, the pallet is inclined following the inclination of the loading portion, but since the forks tilt in a direction approaching parallel to the main surface of the pallet, the forks are prevented from contacting the inner wall surface of the pallet. As a result, the forks are smoothly removed from the pallet in a case of unloading a cargo from the loading portion inclined in the pitch direction.

(2) In (1) described above, the pallet detection unit may acquire point cloud data of the pallet in three dimensions, and when the forks holding the pallet are lowered, the change amount estimation unit may collate latest point cloud data of the pallet acquired by the pallet detection unit with reference point cloud data of the pallet acquired before the latest point cloud data by the pallet detection unit to estimate a change amount of a posture of the pallet with respect to the forks.

In such a configuration, when the forks holding the pallet are lowered in a state where the tilt angle of the forks is constant, the point cloud data of the pallet is periodically three-dimensionally acquired, and the latest point cloud data of the pallet is collated with the reference point cloud data of the pallet, whereby the amount of change in the posture of the pallet with respect to the forks can be easily estimated.

(3) In (1) or (2) described above, the unloading control device may further include a height position detector configured to detect a height position of the forks, the change amount estimation unit may estimate a change amount of a height position and a posture of the pallet with respect to the forks based on detection data of the pallet acquired by the pallet detection unit, a height position of the forks detected by the height position detector, and a tilt angle of the forks detected by the tilt angle detector when the forks holding the pallet are lowered, and the determination unit may determine whether the pallet held by the forks abuts on an upper surface of the loading portion based on the change amount of the height position and the posture of the pallet with respect to the forks estimated by the change amount estimation unit.

In such a configuration, it is determined whether or not the pallet held by the forks abuts on the upper surface of the loading portion based on the height position and the amount of change in the posture of the pallet with respect to the forks. When the pallet abuts on the upper surface of the loading portion inclined in the pitch direction, the height position and posture of the pallet with respect to the forks change. When the pallet abuts on the upper surface of the loading portion that is not inclined, the height position of the pallet with respect to the forks changes, but the posture of the pallet with respect to the forks does not change. Therefore, when the pallet abuts on the upper surface of the loading portion inclined in the pitch direction, since the pallet is inclined following the inclination of the loading portion, the forks are tilted in a direction approaching parallel to the main surface of the pallet. On the other hand, when the pallet abuts on the upper surface of the loading portion that is not inclined, the forks are not necessarily tilted.

(4) In (3) described above, the determination unit may determine that the pallet held by the forks abuts on the upper surface of the loading portion when the change amount of the posture of the pallet with respect to the forks is larger than a first threshold, and determine that the pallet held by the forks abuts on the upper surface of the loading portion when the change amount of the posture of the pallet with respect to the forks is equal to or smaller than the first threshold and a change amount of a height position of the pallet with respect to the forks is equal to or larger than a second threshold, and the tilting control unit may control the tilt cylinder such that the forks tilt in a direction approaching parallel to a main surface of the pallet when the change amount of the posture of the pallet with respect to the forks is larger than the first threshold.

In such a configuration, when the amount of change in the posture of the pallet with respect to the forks is larger than the first threshold, it is determined that the pallet abuts on the upper surface of the loading portion inclined in the pitch direction, and the forks tilt in a direction approaching parallel to the main surface of the pallet. When the amount of change in the posture of the pallet with respect to the forks is equal to or smaller than the first threshold and the amount of change in the height position of the pallet with respect to the forks is equal to or larger than the second threshold, it is determined that the pallet abuts on the upper surface of the loading portion that is not inclined, and the forks do not tilt.

(5) In (1) or (2) described above, the unloading control device may further include a pallet holding detector configured to detect whether or not the pallet is held by the forks, and the determination unit may determine whether or not the pallet held by the forks abuts on an upper surface of the loading portion based on the change amount of the posture of the pallet with respect to the forks estimated by the change amount estimation unit and a detection result of the pallet holding detector.

In such a configuration, it is determined whether or not the pallet held by the forks abuts on the upper surface of the loading portion based on the amount of change in the posture of the pallet with respect to the forks and the detection result as to whether or not the pallet is in a state of being held by the fork. When the pallet abuts on the upper surface of the loading portion inclined in the pitch direction, the posture of the pallet with respect to the forks changes in a state where the pallet is held by the forks. When the pallet abuts on the upper surface of the loading portion that is not inclined, the pallet becomes in a state of not being held by the fork, and the posture of the pallet with respect to the forks does not change. Therefore, when the pallet abuts on the upper surface of the loading portion inclined in the pitch direction, since the pallet is inclined following the inclination of the loading portion, the forks are tilted in a direction approaching parallel to the main surface of the pallet. When the pallet abuts on the upper surface of the loading portion that is not inclined, the forks are not necessarily tilted.

(6) In (5) described above, the determination unit may determine that the pallet held by the forks abuts on the upper surface of the loading portion when the change amount of the posture of the pallet with respect to the forks is larger than a threshold, and determines that the pallet held by the forks abuts on the upper surface of the loading portion when the change amount of the posture of the pallet with respect to the forks is equal to or smaller than the threshold and the pallet holding detector detects that the pallet is not held by the forks, and the tilting control unit may control the tilt cylinder such that the forks tilt in a direction approaching parallel to a main surface of the pallet when the change amount of the posture of the pallet with respect to the forks is larger than the threshold.

In such a configuration, when the amount of change in the posture of the pallet with respect to the forks is larger than the threshold, it is determined that the pallet abuts on the upper surface of the loading portion inclined in the pitch direction, and the forks tilt in a direction approaching parallel to the main surface of the pallet. When the amount of change in the posture of the pallet with respect to the forks is equal to or smaller than the threshold and the pallet is in a state of not being held by the forks, it is determined that the pallet abuts on the upper surface of the loading portion that is not inclined, and the forks do not tilt.

Advantageous Effects of Invention

According to the present invention, it is possible to smoothly remove the forks from a pallet in a case of unloading a cargo from a loading portion inclined in a pitch direction.

DETAILED DESCRIPTION

Figure 1:
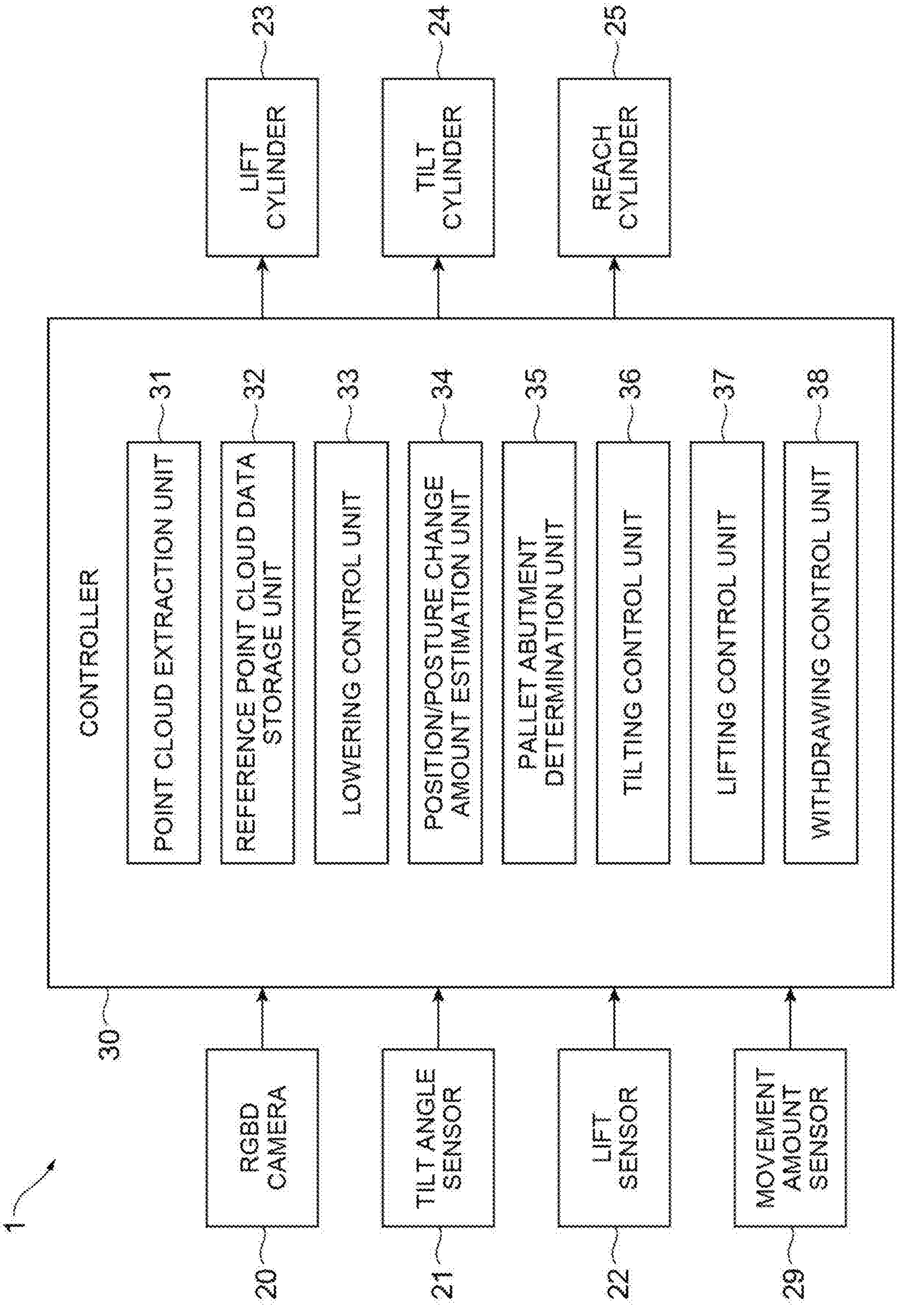
FIG. 1 is a block diagram illustrating a configuration of an unloading control device according to a first embodiment of the present invention.

An embodiment of the present disclosure will be described in detail below with reference to the drawings. In the drawings, the same or equivalent elements will be denoted by the same reference signs, and a repeated description will be omitted.

Figure 2:
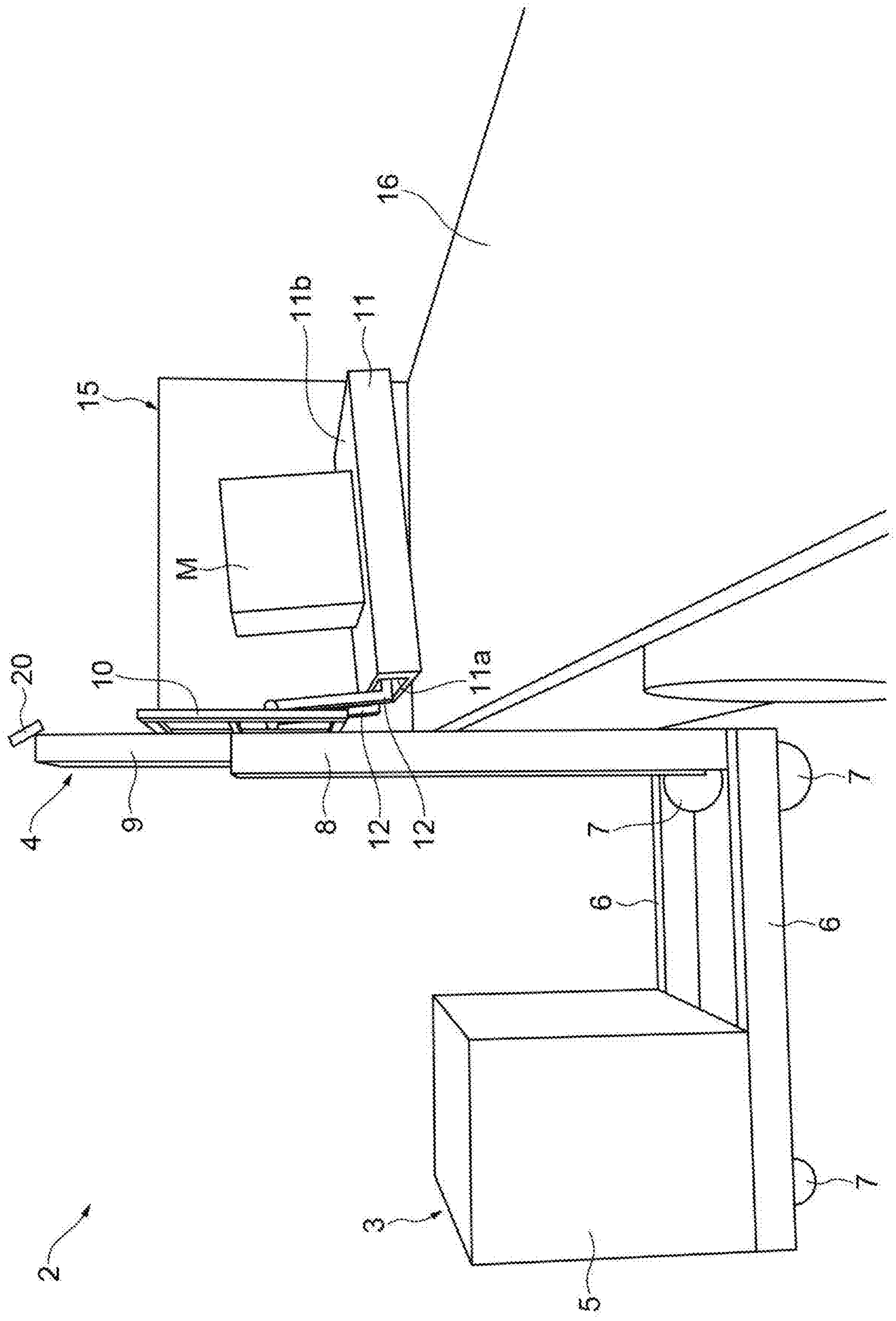
FIG. 2 is a perspective view illustrating a state in which a forklift mounted with the unloading control device illustrated in FIG. 1 performs unloading a cargo from a cargo bed of a truck.

FIG. 1 is a block diagram illustrating a configuration of an unloading control device according to a first embodiment of the present invention. In FIG. 1, an unloading control device 1 according to the present embodiment is mounted on a forklift 2. The forklift 2 is a reach-type forklift as illustrated in FIG. 2. The forklift 2 includes a traveling device 3 and a load-handling device 4.

The traveling device 3 includes a vehicle body 5, a pair of left and right reach legs 6 disposed below the vehicle body 5, and front, rear, left, and right wheels 7.

The load-handling device 4 includes a pair of left and right outer masts 8 disposed between each of the reach legs 6 to be movable in the front-rear direction, an inner mast 9 disposed inside the outer mast 8 in the left-right direction (vehicle width direction) so as to be raised and lowered with respect to the outer mast 8, and a pair of left and right forks 12 attached to the inner mast 9 so as to be raised and lowered via a lift bracket 10 and holding a pallet 11.

The forks 12 have an L shape. The forks 12 include a connecting portion 17 rotatably connected to the lift bracket 10 and a claw portion 18 extending forward from a lower end portion of the connecting portion 17 (see FIGS. 6A to 6C and the like).

The pallet 11 is, for example, a flat pallet made of plastic or wood. The pallet 11 has a square shape or a substantially square shape in planar view. A cargo M is placed on the pallet 11. The pallet 11 is provided with a fork hole 11*a* into which the claw portion 18 of the forks 12 is inserted.

The unloading control device 1 is a device for unloading a cargo onto a cargo bed 16 of a truck 15 by automatic operation of the forklift 2. The unloading control device 1 unloads the cargo onto the cargo bed 16 on the side of the truck 15. Specifically, the unloading control device 1 loads the pallet 11 held by the forks 12 on the cargo bed 16, and removes the forks 12 from the pallet 11. The cargo bed 16 of the truck 15 is a loading portion on which the pallet 11 is loaded.

In the truck 15, since the height of the cargo bed 16 differs between the left and right depending on the operation of the left and right suspensions (not illustrated), the cargo bed 16 may be inclined along the vehicle width direction. In this case, when unloading is performed on the cargo bed 16 of the truck 15, the cargo bed 16 is inclined in the pitch direction from the forklift 2 (see FIGS. 7A to 7C and FIGS. 9A to 9C).

Returning to FIG. 1, the unloading control device 1 includes an RGBD camera 20, a tilt angle sensor 21, a lift sensor 22, a lift cylinder 23, a tilt cylinder 24, a reach cylinder 25, a movement amount sensor 29, and a controller 30.

The RGBD camera 20 is a camera that captures an image of the pallet 11 held by the forks 12. The RGBD camera 20 images the pallet 11 held by the forks 12 together with the cargo M in a state where the cargo M is placed on the pallet 11. The RGBD camera 20 is attached to an upper portion of the inner mast 9 (see FIG. 2). Note that the mounting position of the RGBD camera 20 is not particularly limited to the inner mast 9, and may be the outer mast 8, the vehicle body 5, or the like.

Figure 3:
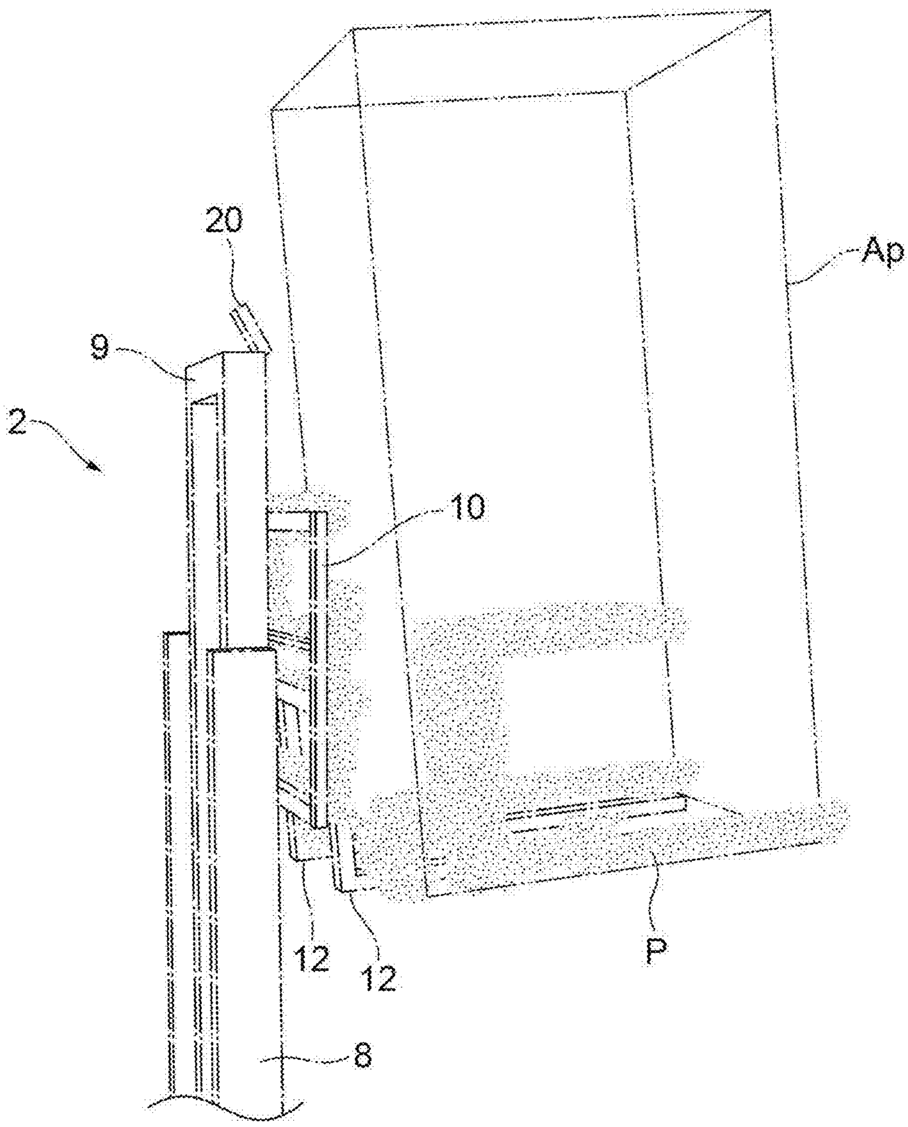
FIG. 3 is a diagram illustrating an example of point cloud data acquired by a RGBD camera illustrated in FIG. 1 together with a load-handling device of a forklift.

The RGBD camera 20 is a type of depth camera capable of capturing color information (RGB) and depth information (D). As illustrated in FIG. 3, the RGBD camera 20 measures a distance to a surrounding object and acquires a point cloud P of the object in three dimensions. The point cloud P is a group of reflection points of light emitted from the RGBD camera 20.

The tilt angle sensor 21 is a sensor that detects a tilt angle (tilting angle) of the forks 12 with respect to the inner mast 9. The tilt angle sensor 21 constitutes a tilt angle detector that detects a tilt angle of the forks 12. The tilt angle sensor 21 is attached to, for example, the lift bracket 10.

The lift sensor 22 is a sensor that detects the height from the ground to the claw portion 18 of the forks 12. The lift sensor 22 constitutes a height position detector that detects the height position of the forks 12. The lift sensor 22 is attached to, for example, the lift bracket 10.

The lift cylinder 23 is a hydraulic cylinder that raises and lowers the forks 12. The tilt cylinder 24 is a hydraulic cylinder that tilts the forks 12 in the front-rear direction. The reach cylinder 25 is a hydraulic cylinder that moves (advances and retreats) the forks 12 in the front-rear direction by moving the outer mast 8 in the front-rear direction.

The movement amount sensor 29 is a sensor that detects a movement amount (advancing and retracting amount) of the forks 12 in the front-rear direction by the reach cylinder 25.

The controller 30 is constituted with a CPU, a RAM, a ROM, an input/output interface, and the like. The controller 30 includes a point cloud extraction unit 31, a reference point cloud data storage unit 32, a lowering control unit 33, a position/posture change amount estimation unit 34, a pallet abutment determination unit 35, a tilting control unit 36, a lifting control unit 37, and a withdrawing control unit 38.

The point cloud extraction unit 31 extracts, as point cloud data, only the point cloud P existing in a point cloud extraction region Ap (see FIG. 3) among the three-dimensional point cloud P acquired by the RGBD camera 20. The point cloud extraction region Ap is a rectangular parallelepiped region including a point cloud P corresponding to the pallet 11 and a point cloud P corresponding to an object existing in the vicinity of the pallet 11. The object existing in the vicinity of the pallet 11 includes the cargo M placed on the pallet 11.

The point cloud extraction unit 31 cooperates with the RGBD camera 20 to configure a pallet detection unit that detects the pallet 11 held by the forks 12 and acquires detection data of the pallet 11. The point cloud extraction unit 31 acquires the point cloud data of the pallet 11 three dimensionally as the detection data of the pallet 11.

The reference point cloud data storage unit 32 stores the point cloud data including the point cloud P corresponding to the pallet 11 extracted by the point cloud extraction unit 31 at the start of unloading in an internal memory (not illustrated) as reference point cloud data.

The lowering control unit 33 controls the lift cylinder 23 so as to lower the forks 12 holding the pallet 11 toward the cargo bed 16 of the truck 15.

When the forks 12 holding the pallet 11 are lowered, the position/posture change amount estimation unit 34 estimates the amount of change in the height position and posture of the pallet 11 with respect to the forks 12 based on the point cloud data extracted by the point cloud extraction unit 31, the height position of the forks 12 detected by the lift sensor 22, and the tilt angle of the forks 12 detected by the tilt angle sensor 21.

The height position of the pallet 11 with respect to the forks 12 is a relative height position of the pallet 11 with respect to the claw portion 18 of the forks 12. Specifically, the height position of the pallet 11 with respect to the forks 12 is the height position of the opening upper edge of the fork hole 11*a* of the pallet 11 with respect to the claw portion 18 of the forks 12. The posture of the pallet 11 with respect to the forks 12 is a relative posture of the pallet 11 with respect to the claw portion 18 of the forks 12. Specifically, the posture of the pallet 11 with respect to the forks 12 is a pitch angle of the pallet 11 with respect to the claw portion 18 of the forks 12.

The position/posture change amount estimation unit 34 constitutes a change amount estimation unit that estimates the amount of change in the posture of the pallet 11 with respect to the forks 12 based on the detection data of the pallet 11 acquired by the point cloud extraction unit 31 and the tilt angle of the forks 12 detected by the tilt angle sensor 21, when the forks 12 holding the pallet 11 are lowered.

When the forks 12 holding the pallet 11 are lowered, the position/posture change amount estimation unit 34 collates the latest point cloud data of the pallet 11 acquired by the point cloud extraction unit 31 with reference point cloud data of the pallet 11 acquired before the latest point cloud by the point cloud extraction unit 31, and estimates the amount of change in the posture of the pallet 11 with respect to the forks 12. The reference point cloud data of the pallet 11 acquired before the latest point cloud data by the point cloud extraction unit 31 is the reference point cloud data stored in the reference point cloud data storage unit 32.

The pallet abutment determination unit 35 determines whether or not the pallet 11 held by the forks 12 abuts on an upper surface 16*a* (see FIGS. 6A to 9C) of the cargo bed 16 of the truck 15 based on the amount of change in the height position and the posture of the pallet 11 with respect to the forks 12 estimated by the position/posture change amount estimation unit 34.

When the amount of change in the posture of the pallet 11 with respect to the forks 12 is larger than the angle threshold (first threshold), the pallet abutment determination unit 35 determines that the pallet 11 held by the forks 12 abuts on the upper surface 16*a* of the cargo bed 16. When the amount of change in the posture of the pallet 11 with respect to the forks 12 is equal to or less than the angle threshold and the change amount of the height position of the pallet 11 with respect to the forks 12 is equal to or more than the height threshold (second threshold), the pallet abutment determination unit 35 determines that the pallet 11 held by the forks 12 abuts on the upper surface 16*a* of the cargo bed 16.

The pallet abutment determination unit 35 constitutes a determination unit that determines whether or not the pallet 11 held by the forks 12 abuts on the upper surface 16*a* of the cargo bed 16 based on the amount of change in the posture of the pallet 11 with respect to the forks 12 estimated by a change amount estimation unit.

When the pallet abutment determination unit 35 determines that the pallet 11 held by the forks 12 abuts on the upper surface 16*a* of the cargo bed 16, the tilting control unit 36 controls the tilt cylinder 24 so that the forks 12 tilt in a direction approaching parallel to a main surface 11*b* of the pallet 11 based on the detected value of the tilt angle sensor 21. The main surface 11*b* of the pallet 11 is two opposing placement surfaces on which the cargo M is placed on the pallet 11.

When the amount of change in the posture of the pallet 11 with respect to the forks 12 is larger than the angle threshold, the tilting control unit 36 controls the tilt cylinder 24 so that the forks 12 tilt in a direction approaching parallel to a main surface 11*b* of the pallet 11 based on the detected value of the tilt angle sensor 21.

When the pallet abutment determination unit 35 determines that the pallet 11 held by the forks 12 abuts on the upper surface 16*a* of the cargo bed 16, the lifting control unit 37 controls the lift cylinder 23 so as to raise and lower the forks 12 in a direction not contacting the inner wall surface of the pallet 11 based on the detected value of the lift sensor 22.

After the processing of the tilting control unit 36 and the lifting control unit 37 is executed, the withdrawing control unit 38 controls the reach cylinder 25 to remove the forks 12 from the pallet 11 according to the tilt angle of the forks 12 detected by the tilt angle sensor 21 and the amount of movement of the forks 12 in the front-rear direction detected by the movement amount sensor 29. After the forks 12 approach the main surface 11*b* of the pallet 11 in parallel, the withdrawing control unit 38 controls the reach cylinder 25 to remove the forks 12 from the pallet 11 according to the tilt angle of the forks 12 and the amount of movement of the forks 12 in the front-rear direction.

Figure 4:
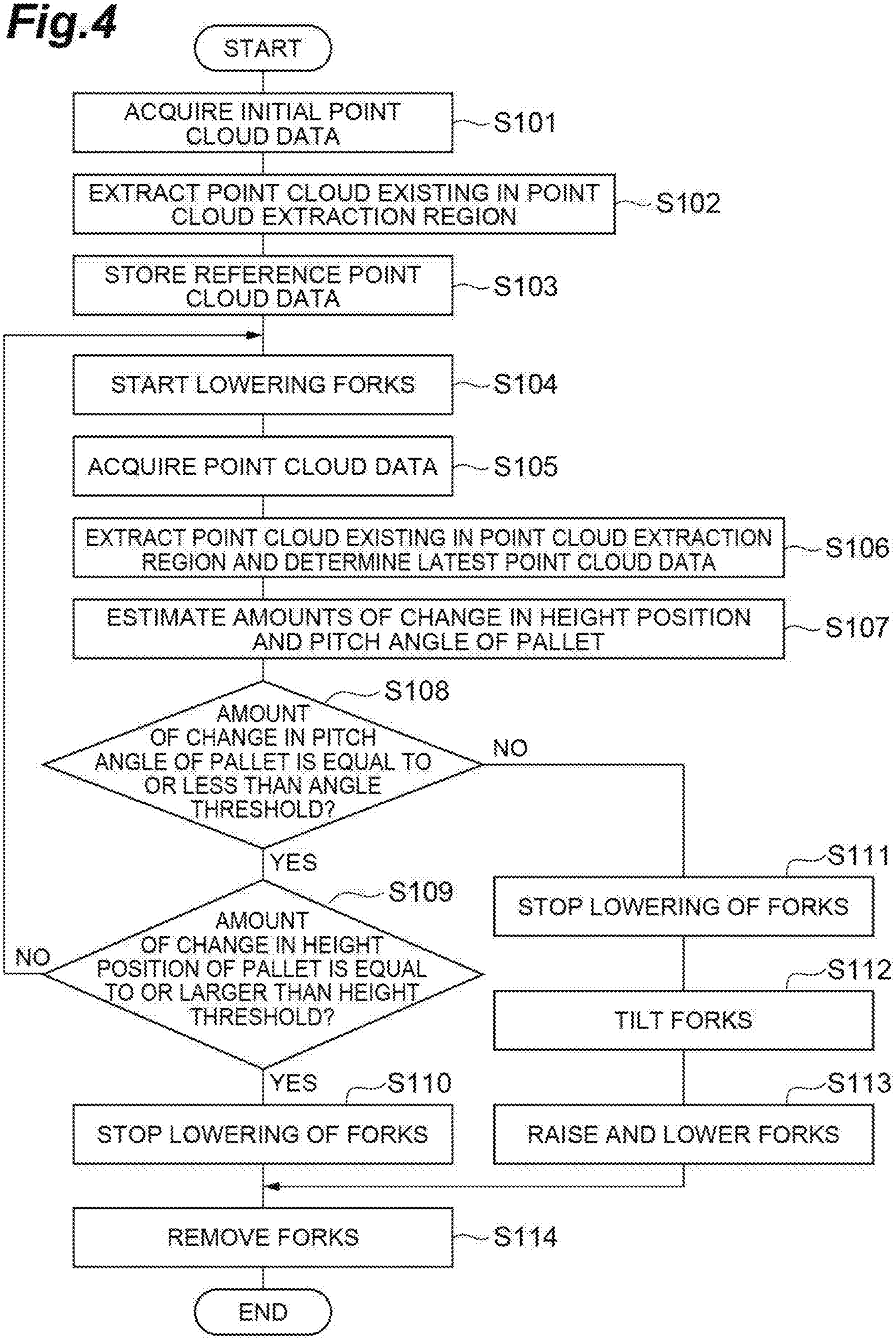
FIG. 4 is a flowchart indicating procedure of unloading control processing to be executed by a controller illustrated in FIG. 1.

FIG. 4 is a flowchart indicating procedure of unloading controlling processing to be executed by the controller 30. This processing is executed when the start of unloading is instructed in a state where the pallet 11 is held by the forks 12.

Figure 6A:
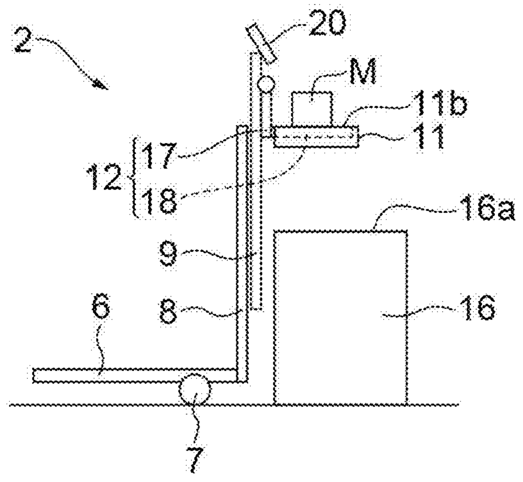
FIGS. 6A to 6C are side views illustrating an operation in which the forklift truck lowers the pallet onto a cargo bed not inclined in the pitch direction and removes the forks from the pallet.

At the start of the execution of the present processing, the forks 12 are at a position higher than the cargo bed 16 of the truck 15 in a state where the forks 12 hold the pallet 11 so as to extend in the horizontal direction (see FIG. 6A and the like). In addition, in a state where the pallet 11 is held by the forks 12, the forks 12 are in contact with the upper inner wall surface of the pallet 11 (see FIG. 6A and the like).

In FIG. 4, the controller 30 first acquires initial point cloud data of the RGBD camera 20 (step S101). Then, the controller 30 extracts a point cloud existing in the point cloud extraction region Ap (see FIG. 3) based on the initial point cloud data of the RGBD camera 20 (step S102). Subsequently, the controller 30 stores the point cloud data including the point cloud existing in the point cloud extraction region Ap in the internal memory (not illustrated) as the reference point cloud data (step S103).

Subsequently, the controller 30 controls the lift cylinder 23 so as to start lowering the forks 12 (step S104). Subsequently, the controller 30 acquires point cloud data of the RGBD camera 20 (step S105). Then, the controller 30 extracts the point cloud existing in the point cloud extraction region Ap based on the point cloud data of the RGBD camera 20, and determines the point cloud data including the point cloud existing in the point cloud extraction region Ap as the latest point cloud data (step S106).

Subsequently, the controller 30 estimates the amounts of change in the height position and the pitch angle of the pallet 11 with respect to the forks 12 based on the latest point cloud data determined in step S106, the reference point cloud data stored in step S103, and the detected values of the tilt angle sensor 21 and the lift sensor 22 (step S107). The controller 30 extracts the difference between the latest point cloud data and the reference point cloud data to estimate the amounts of change in the height position and the pitch angle of the pallet 11 with respect to the forks 12.

In a state where the pallet 11 is normally held by the forks 12, the claw portion 18 of the forks 12 comes into contact with the upper inner wall surface of the pallet 11 along the front-rear direction, so that the pitch angle of the pallet 11 with respect to the forks 12 is 0 degrees.

Specifically, the controller 30 estimates the height position and the pitch angle of the pallet 11 with respect to the forks 12 from the reference point cloud data and the latest point cloud data using a three-dimensional point cloud registration method such as iterative closest point (ICP). The ICP is performed to align the measurement point cloud and the reference point cloud by minimizing the distance between the measurement point cloud and the reference point cloud, that is, to appropriately translate and rotate the reference point cloud. At this time, the point cloud of the reference point cloud data is translated and rotated using the tilt angle of the forks 12 detected by the tilt angle sensor 21 and the height position of the forks 12 detected by the lift sensor 22, thereby improving the accuracy of estimating the height position and the pitch angle of the pallet 11 with respect to the forks 12 and the calculation speed of registration.

Subsequently, the controller 30 determines whether or not the amount of change in the pitch angle of the pallet 11 with respect to the forks 12 estimated in step S107 is equal to or less than a predetermined angle threshold (step S108). When determining that the amount of change in the pitch angle of the pallet 11 with respect to the forks 12 is equal to or smaller than the angle threshold, the controller 30 determines whether or not the amount of change in the height position of the pallet 11 with respect to the forks 12 estimated in step S107 is equal to or larger than a predetermined height threshold (step S109).

When the controller 30 determines that the amount of change in the height position of the pallet 11 with respect to the forks 12 is not equal to or larger than the height threshold, the above-described step S104 is executed again. When determining that the amount of change in the height position of the pallet 11 with respect to the forks 12 is equal to or larger than the height threshold, the controller 30 controls the lift cylinder 23 so as to stop lowering of the forks 12 (step S110).

When determining that the amount of change in the pitch angle of the pallet 11 with respect to the forks 12 is not equal to or smaller than the angle threshold in step S108, the controller 30 controls the lift cylinder 23 so as to stop lowering of the forks 12 (step S111).

Then, based on the detected value of the tilt angle sensor 21, the controller 30 controls the tilt cylinder 24 so that the forks 12 tilt until the claw portion 18 of the forks 12 becomes parallel to the main surface 11*b* of the pallet 11 (step S112). In addition, the controller 30 controls the lift cylinder 23 to raise and lower the forks 12 to a height position at which the claw portion 18 of the forks 12 does not contact the inner wall surface of the pallet 11 based on the detected value of the lift sensor 22 (step S113). Note that the steps S112 and S113 may be executed simultaneously.

After executing step S110 or step S113 described above, the controller 30 controls the reach cylinder 25 to remove the forks 12 from the pallet 11 (step S114).

Figure 5:
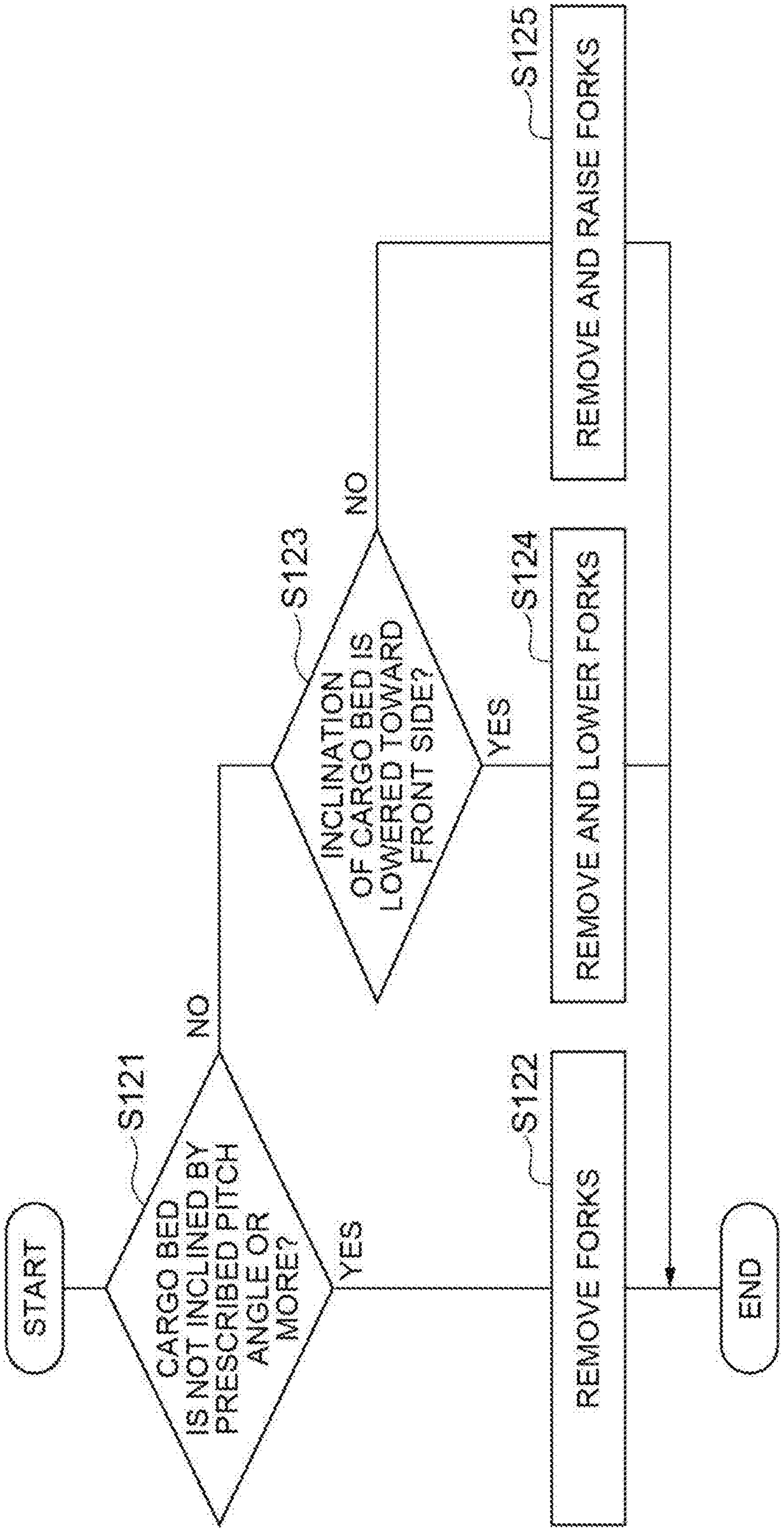
FIG. 5 is a flowchart illustrating details of step S114 in FIG. 4.

FIG. 5 is a flowchart illustrating details of step S114. In FIG. 5, the controller 30 determines whether or not the cargo bed 16 of the truck 15 is not inclined by a prescribed pitch angle or more based on the detected value of the tilt angle sensor 21 (step S121). The prescribed pitch angle is a pitch angle at which the claw portion 18 of the forks 12 does not come into contact with the pallet 11 when the forks 12 are removed from the pallet 11 as it is.

When it is determined that the cargo bed 16 is not inclined by the prescribed pitch angle or more (see FIGS. 6A to 6C), the controller 30 controls the reach cylinder 25 so that the forks 12 are removed from the pallet 11 (step S122).

When determining that the cargo bed 16 is inclined by the prescribed pitch angle or more (see FIGS. 7A to 9C), the controller 30 determines whether or not the inclination of the cargo bed 16 is lowered toward the front side (the forklift 2 side) based on the detected value of the tilt angle sensor 21 (step S123).

When determining that the inclination of the cargo bed 16 is lowered to the front side (see FIGS. 7A to 7C and FIGS. 8A TO 8C), the controller 30 controls the reach cylinder 25 so that the forks 12 are removed from the pallet 11, and controls the lift cylinder 23 to lower the forks 12 according to the amount of movement of the forks 12 in the front-rear direction detected by the movement amount sensor 29 (step S124).

At this time, the controller 30 sets the lowering amount of the forks 12 according to the movement amount of the forks 12 in the front-rear direction so that the forks 12 do not come into contact with the pallet 11 when the forks 12 are removed from the pallet 11. Specifically, the controller 30 generates a target track L on the extension of the claw portion 18 of the forks 12 based on the tilt angle θ of the forks 12 detected by the tilt angle sensor 21, and sets the lowering amount of the forks 12 so that the claw portion 18 moves along the target track L (see FIGS. 8A to 8C).

When determining that the inclination of the cargo bed 16 is lowered not to the front side but to the back side (see FIGS. 9A to 9C), the controller 30 controls the reach cylinder 25 to remove the forks 12 from the pallet 11, and controls the lift cylinder 23 to raise the forks 12 according to the amount of movement of the forks 12 in the front-rear direction detected by the movement amount sensor 29 (step S125).

At this time, the controller 30 sets the raising amount of the forks 12 according to the movement amount of the forks 12 in the front-rear direction so that the forks 12 do not come into contact with the pallet 11 when the forks 12 are removed from the pallet 11. Specifically, the controller 30 generates a target track L on the extension of the claw portion 18 of the forks 12 based on the tilt angle θ of the forks 12 detected by the tilt angle sensor 21, and sets the raising amount of the forks 12 so that the claw portion 18 moves along the target track L.

Here, the point cloud extraction unit 31 executes steps S101, S102, S105, and S106. The reference point cloud data storage unit 32 executes step S103. The lowering control unit 33 executes steps S104, S110, and S111. The position/posture change amount estimation unit 34 executes step S107. The pallet abutment determination unit 35 executes steps S108, and S109. The tilting control unit 36 executes step S112. The lifting control unit 37 executes step S113. The withdrawing control unit 38 executes step S114.

As described above, as illustrated in FIG. 6A, when unloading a cargo is performed on the cargo bed 16 that is not inclined in the pitch direction from the forklift 2, first, the forks 12 holding the pallet 11 are lowered by the lift cylinder 23 toward the cargo bed 16. Then, the pallet 11 abuts on the upper surface 16*a* of the cargo bed 16. At this time, since the main surface 11*b* of the pallet 11 is parallel to the upper surface 16*a* of the cargo bed 16, even when the pallet 11 abuts on the upper surface 16*a* of the cargo bed 16, the pitch angle of the pallet 11 with respect to the forks 12 does not change.

Figure 6B:
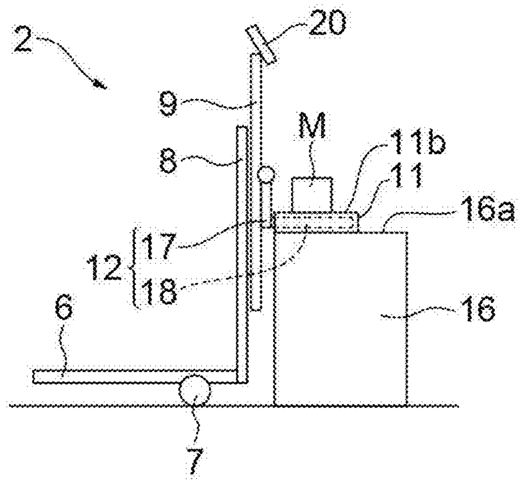

However, even after the pallet 11 abuts on the upper surface 16*a* of the cargo bed 16, lowering the forks 12 continues. Therefore, as illustrated in FIG. 6B, a gap is formed between the forks 12 and the upper inner wall surface of the pallet 11, and the height position of the pallet 11 with respect to the forks 12 changes to be higher. Then, when the amount of change in the height position of the pallet 11 with respect to the forks 12 reaches the height threshold, the lowering of the forks 12 by the lift cylinder 23 is stopped (see steps S108 to S110 in FIG. 4). At this time, the forks 12 are not in contact with the upper and lower inner wall surfaces of the pallet 11.

Figure 6C:
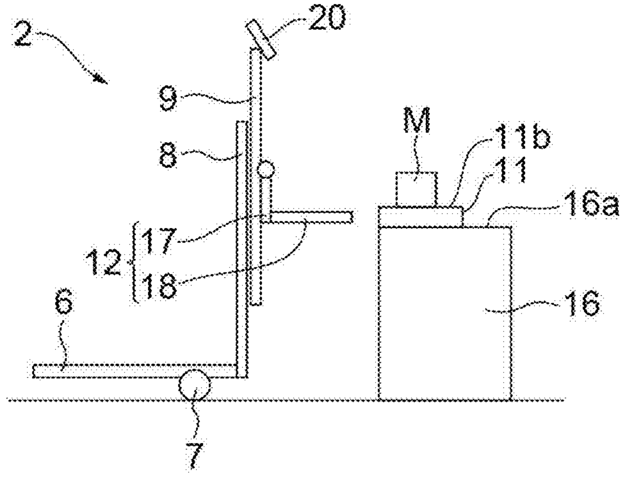

Thereafter, when the reach cylinder 25 causes the forks 12 to perform retraction or the forklift 2 is retracted, the forks 12 are removed from the pallet 11 as illustrated in FIG. 6C (see steps S121 and S122 in FIG. 5). This completes unloading of the cargo from the cargo bed 16.

Figure 7A:
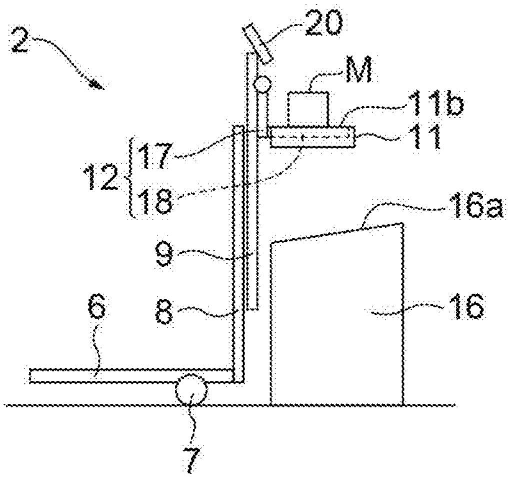
FIGS. 7A to 7C are side views illustrating an operation of lowering the pallet onto a cargo bed inclined to lower the forklift toward the front side.

As illustrated in FIG. 7A, when unloading is performed on the cargo bed 16 inclined downward toward the forklift 2 (near side), the forks 12 holding the pallet 11 is lowered as described above. Then, the pallet 11 abuts on the upper surface 16*a* of the cargo bed 16.

Figure 7B:
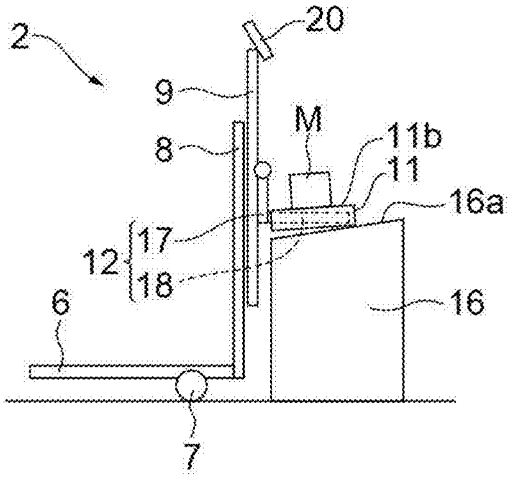

At this time, since the upper surface 16*a* of the cargo bed 16 is inclined downward toward the front side, as illustrated in FIG. 7B, the back end of the bottom surface of the pallet 11 held by the forks 12 first abuts on the upper surface 16*a* of the cargo bed 16. Since the pallet 11 tilts along the upper surface 16*a* of the cargo bed 16, the pitch angle of the pallet 11 with respect to the forks 12 changes. Then, when the amount of change in the pitch angle of the pallet 11 with respect to the forks 12 exceeds the angle threshold, the lowering of the forks 12 by the lift cylinder 23 is stopped (see steps S108 to S111 in FIG. 4).

Figure 7C:
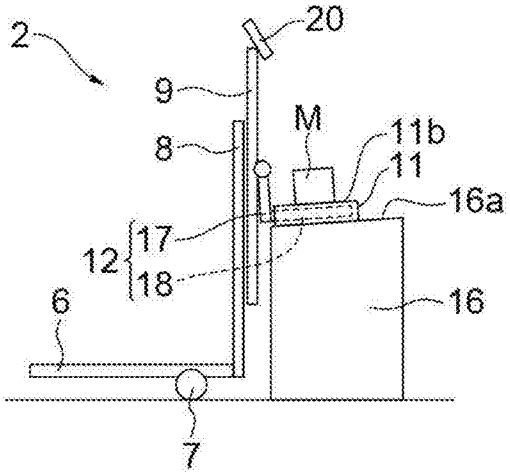

Then, as illustrated in FIG. 7C, the tilt cylinder 24 tilts the forks 12 backward so that the claw portion 18 of the forks 12 is parallel to the main surface 11*b* of the pallet 11, and the lift cylinder 23 slightly lowers the forks 12 so that the claw portion 18 of the forks 12 does not contact the inner wall surface of the pallet 11 (see steps S112 and S113 in FIG. 4). As a result, gaps are formed between the forks 12 and the upper and lower inner wall surfaces of the pallet 11.

Figure 8A:
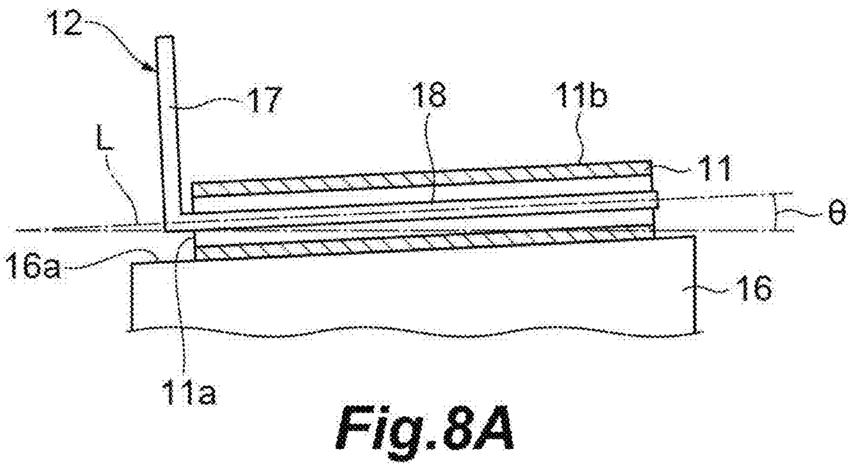
FIGS. 8A to 8C are cross-sectional views illustrating an operation of removing the forks from the pallet lowered on the cargo bed illustrated in FIGS. 7A to 7C.
Figure 8B:
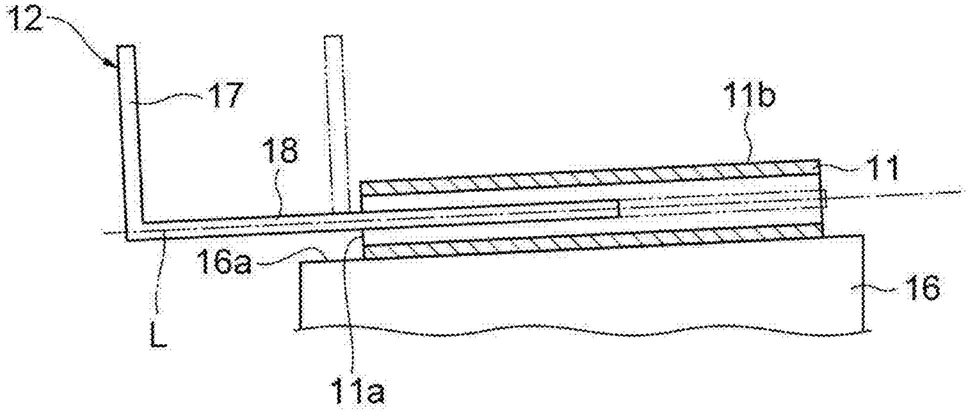
Figure 8C:
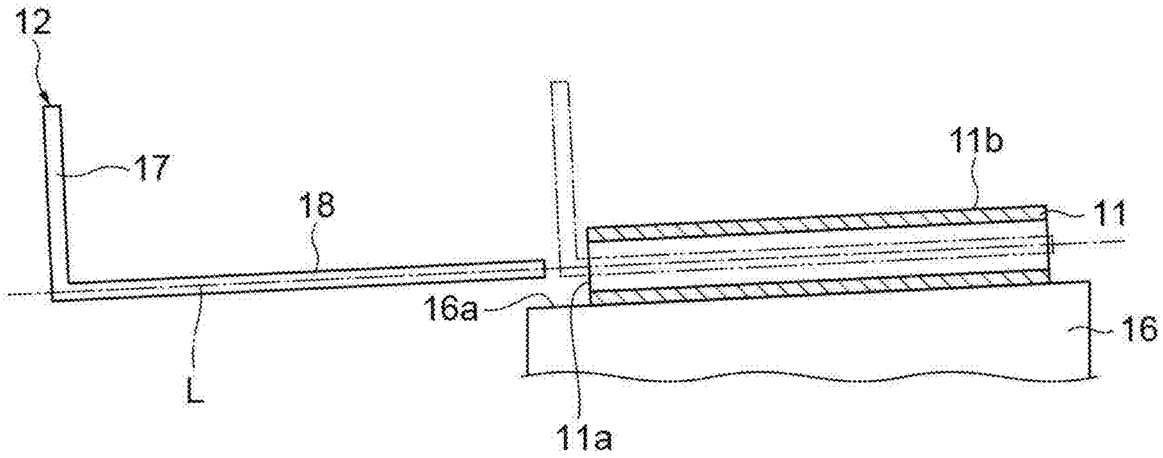

Thereafter, when the reach cylinder 25 causes the forks 12 to perform retraction or the forklift 2 is retracted, the forks 12 are removed from the pallet 11 as illustrated in FIGS. 8A to 8C. At this time, the forks 12 are removed from the pallet 11 while the forks 12 are lowered so as not to come into contact with the inner wall surface of the pallet 11 (see steps S123 and S124 in FIG. 5). Therefore, when the forks 12 are removed from the pallet 11, the forks 12 are prevented from being caught on the inner wall surface of the pallet 11.

Figure 9A:
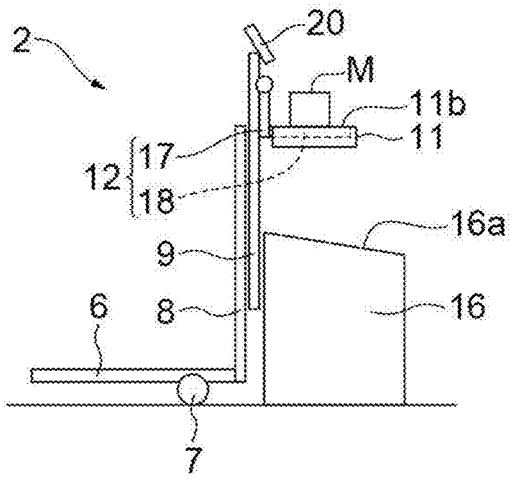
FIGS. 9A to 9C are side views illustrating an operation of lowering the pallet onto a cargo bed inclined to lower the forklift toward the back side.

As illustrated in FIG. 9A, when unloading is performed on the cargo bed 16 inclined downward to the opposite side of the forklift 2 (back side), the forks 12 holding the pallet 11 are lowered as described above. Then, the pallet 11 abuts on the upper surface 16*a* of the cargo bed 16.

Figure 9B:
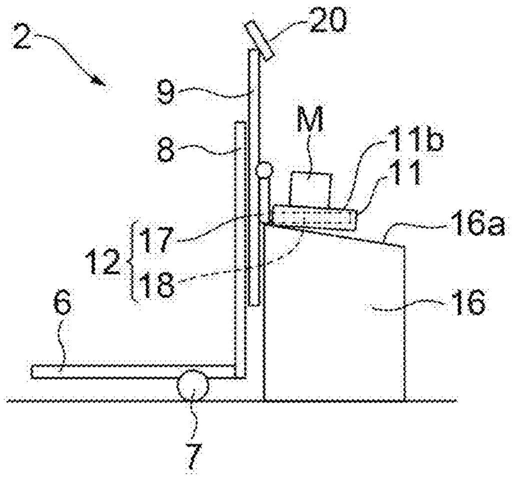

At this time, since the upper surface 16*a* of the cargo bed 16 is inclined downward toward the back side, as illustrated in FIG. 9B, the front end of the bottom surface of the pallet 11 held by the forks 12 first abuts on the upper surface 16*a* of the cargo bed 16. Since the pallet 11 tilts along the upper surface 16*a* of the cargo bed 16, the pitch angle of the pallet 11 with respect to the forks 12 changes. Then, when the amount of change in the pitch angle of the pallet 11 with respect to the forks 12 exceeds the angle threshold, the lowering of the forks 12 by the lift cylinder 23 is stopped (see steps S108 to S111 in FIG. 4).

Figure 9C:
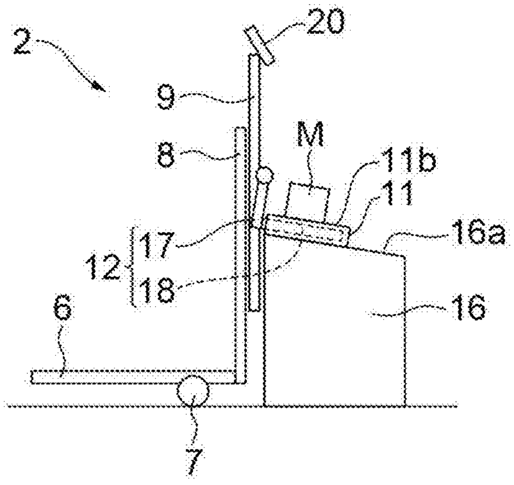

Then, as illustrated in FIG. 9C, the tilt cylinder 24 tilts the forks 12 forward so that the claw portion 18 of the forks 12 is parallel to the main surface 11*b* of the pallet 11, and the lift cylinder 23 slightly raises the forks 12 so that the claw portion 18 of the forks 12 does not contact the inner wall surface of the pallet 11 (see steps S112 and S113 in FIG. 4). As a result, gaps are formed between the forks 12 and the upper and lower inner wall surfaces of the pallet 11.

Thereafter, when the reach cylinder 25 causes the forks 12 to perform retraction or the forklift 2 is retracted, the forks 12 are removed from the pallet 11. At this time, the forks 12 are removed from the pallet 11 while the forks 12 are raised so as not to come into contact with the inner wall surface of the pallet 11 (see steps S123 and S125 in FIG. 5). Therefore, when the forks 12 are removed from the pallet 11, the forks 12 are prevented from being caught on the inner wall surface of the pallet 11.

As described above, in the present embodiment, when unloading the cargo from the cargo bed 16 of the truck 15, the lift cylinder 23 is controlled so as to lower the forks 12 holding the pallet 11 toward the cargo bed 16. At this time, the pallet 11 held by the forks 12 is detected, the tilt angle of the forks 12 is detected, and the amount of change in the posture of the pallet 11 with respect to the forks 12 is estimated. Then, it is determined whether or not the pallet 11 held by the forks 12 abuts on the upper surface 16*a* of the cargo bed 16 based on the amount of change in the posture of the pallet 11 with respect to the forks 12. When the pallet 11 abuts on the upper surface 16*a* of the cargo bed 16 inclined in the pitch direction, the posture of the pallet 11 with respect to the forks 12 changes. Therefore, from the amount of change in the posture of the pallet 11 with respect to the forks 12, it can be seen whether the pallet 11 has abutted on the upper surface 16*a* of the cargo bed 16 inclined in the pitch direction. Then, when it is determined that the pallet 11 held by the forks 12 abuts on the upper surface 16*a* of the cargo bed 16, the tilt cylinder 24 is controlled so that the forks 12 tilts in a direction approaching parallel to the main surface 11*b* of the pallet 11. Thereafter, the forklift 2 is controlled to remove the forks 12 from the pallet 11 according to the tilt angle of the forks 12. Here, when the pallet 11 abuts on the upper surface 16*a* of the cargo bed 16 inclined in the pitch direction, the pallet 11 is inclined following the inclination of the cargo bed 16, but since the forks 12 tilt in a direction approaching parallel to the main surface 11*b* of the pallet 11, the forks 12 are prevented from contacting the inner wall surface of the pallet 11. As a result, the forks 12 are smoothly removed from the pallet 11 in a case of unloading a cargo from the cargo bed 16 inclined in the pitch direction. As a result, even when the inclination degree of the cargo bed 16 in the pitch direction changes due to the load of the cargo bed 16 of the truck 15 due to the effect of the suspension of the truck 15, it is possible to cope with such a case.

In addition, by detecting the pallet 11 held by the forks 12 and estimating the amount of change in the posture of the pallet 11 with respect to the forks 12, unloading a cargo can be performed on the cargo bed 16 inclined in the pitch direction without being restricted by the shape or the like of the cargo M placed on the pallet 11.

In addition, in the present embodiment, the point cloud data of the pallet 11 is acquired in three dimensions, and when the forks 12 holding the pallet 11 are lowered in a state where the tilt angle of the forks 12 is constant, and the latest point cloud data of the pallet 11 is periodically collated with the reference point cloud data of the pallet 11, whereby the amount of change in the posture of the pallet 11 with respect to the forks 12 can be easily estimated.

Further, in the present embodiment, it is determined whether or not the pallet 11 held by the forks 12 abuts on the upper surface 16*a* of the cargo bed 16 based on the amount of change in the height position and posture of the pallet 11 with respect to the forks 12. When the pallet 11 abuts on the upper surface 16*a* of the cargo bed 16 inclined in the pitch direction, the height position and posture of the pallet 11 with respect to the forks 12 change. When the pallet 11 abuts on the upper surface 16*a* of the cargo bed 16 that is not inclined, the height position of the pallet 11 with respect to the forks 12 changes, but the posture of the pallet 11 with respect to the forks 12 does not change. Therefore, when the pallet 11 abuts on the upper surface 16*a* of the cargo bed 16 inclined in the pitch direction, since the pallet 11 is inclined following the inclination of the cargo bed 16, the forks 12 are tilted in a direction approaching parallel to the main surface 11*b* of the pallet 11. On the other hand, when the pallet 11 abuts on the upper surface 16*a* of the cargo bed 16 that is not inclined, the forks 12 are not necessarily tilted.

In addition, in the present embodiment, when the amount of change in the posture of the pallet 11 with respect to the forks 12 is larger than the angle threshold, it is determined that the pallet 11 abuts on the upper surface 16*a* of the cargo bed 16 inclined in the pitch direction, and the forks 12 tilt in a direction approaching parallel to the main surface 11*b* of the pallet 11. When the amount of change in the posture of the pallet 11 with respect to the forks 12 is equal to or smaller than the angle threshold and the amount of change in the height position of the pallet 11 with respect to the forks 12 is equal to or larger than the height threshold, it is determined that the pallet 11 abuts on the upper surface 16*a* of the cargo bed 16 that is not inclined, and the forks 12 do not tilt.

Figure 10:
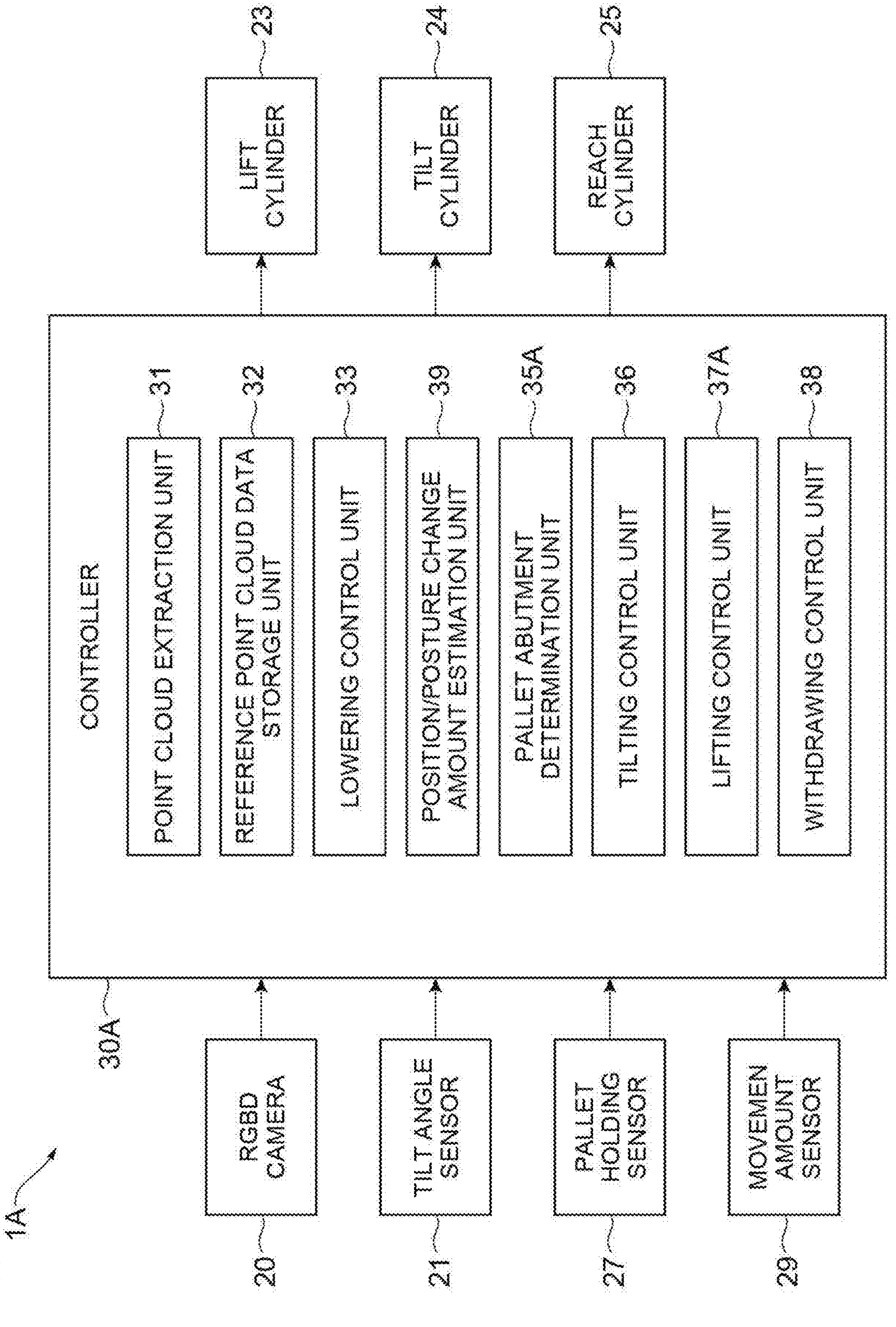
FIG. 10 is a block diagram illustrating a configuration of an unloading control device according to a second embodiment of the present invention.

FIG. 10 is a block diagram illustrating a configuration of an unloading control device according to a second embodiment of the present invention. In FIG. 10, an unloading control device 1A of the present embodiment includes a pallet holding sensor 27 instead of the lift sensor 22 in the first embodiment.

The pallet holding sensor 27 is a sensor (pallet holding detector) that detects whether the pallet 11 is held by the forks 12. As the pallet holding sensor 27, for example, a contact sensor or the like attached to the forks 12 is used. The pallet holding sensor 27 outputs an ON signal when it is detected that the pallet 11 is held by the forks 12.

Further, the unloading control device 1A includes a controller 30A in place of the controller 30 in the above first embodiment. The controller 30A includes a point cloud extraction unit 31, a reference point cloud data storage unit 32, a lowering control unit 33, a posture change amount estimation unit 39, a pallet abutment determination unit 35A, a tilting control unit 36, a lifting control unit 37A, and a withdrawing control unit 38.

When the forks 12 holding the pallet 11 are lowered, the posture change amount estimation unit 39 constitutes a change amount estimation unit that estimates the amount of change in the posture of the pallet 11 with respect to the forks 12 based on the extracted point cloud data extracted by the point cloud extraction unit 31 and the tilt angle of the forks 12 detected by the tilt angle sensor 21.

The pallet abutment determination unit 35A determines whether or not the pallet 11 held by the forks 12 abuts on an upper surface 16*a* of the cargo bed 16 based on the amount of change in the posture of the pallet 11 with respect to the forks 12 estimated by the posture change amount estimation unit 39 and an output signal (detection result) of the pallet holding sensor 27.

When the amount of change in the posture of the pallet 11 with respect to the forks 12 is larger than the angle threshold, the pallet abutment determination unit 35A determines that the pallet 11 held by the forks 12 abuts on the upper surface 16*a* of the cargo bed 16. When the amount of change in the posture of the pallet 11 with respect to the forks 12 is equal to or less than the angle threshold and the pallet holding sensor 27 detects that the pallet 11 is not held by the forks 12, the pallet abutment determination unit 35A determines that the pallet 11 held by the forks 12 abuts on the upper surface 16*a* of the cargo bed 16.

The pallet abutment determination unit 35A constitutes a determination unit that determines whether or not the pallet 11 held by the forks 12 abuts on the upper surface 16*a* of the cargo bed 16 of the truck 15 based on the amount of change in the posture of the pallet 11 with respect to the forks 12 estimated by the posture change amount estimation unit 39.

When the pallet abutment determination unit 35A determines that the pallet 11 held by the forks 12 abuts on the upper surface 16*a* of the cargo bed 16, the tilting control unit 36 controls the tilt cylinder 24 so that the forks 12 tilt in a direction approaching parallel to a main surface 11*b* of the pallet 11 based on the detected value of the tilt angle sensor 21.

When the pallet abutment determination unit 35A determines that the pallet 11 held by the forks 12 abuts on the upper surface 16*a* of the cargo bed 16, the lifting control unit 37A controls the lift cylinder 23 so as to raise and lower the forks 12 in a direction not contacting the inner wall surface of the pallet 11 based on the output signal of the pallet holding sensor 27.

Figure 11:
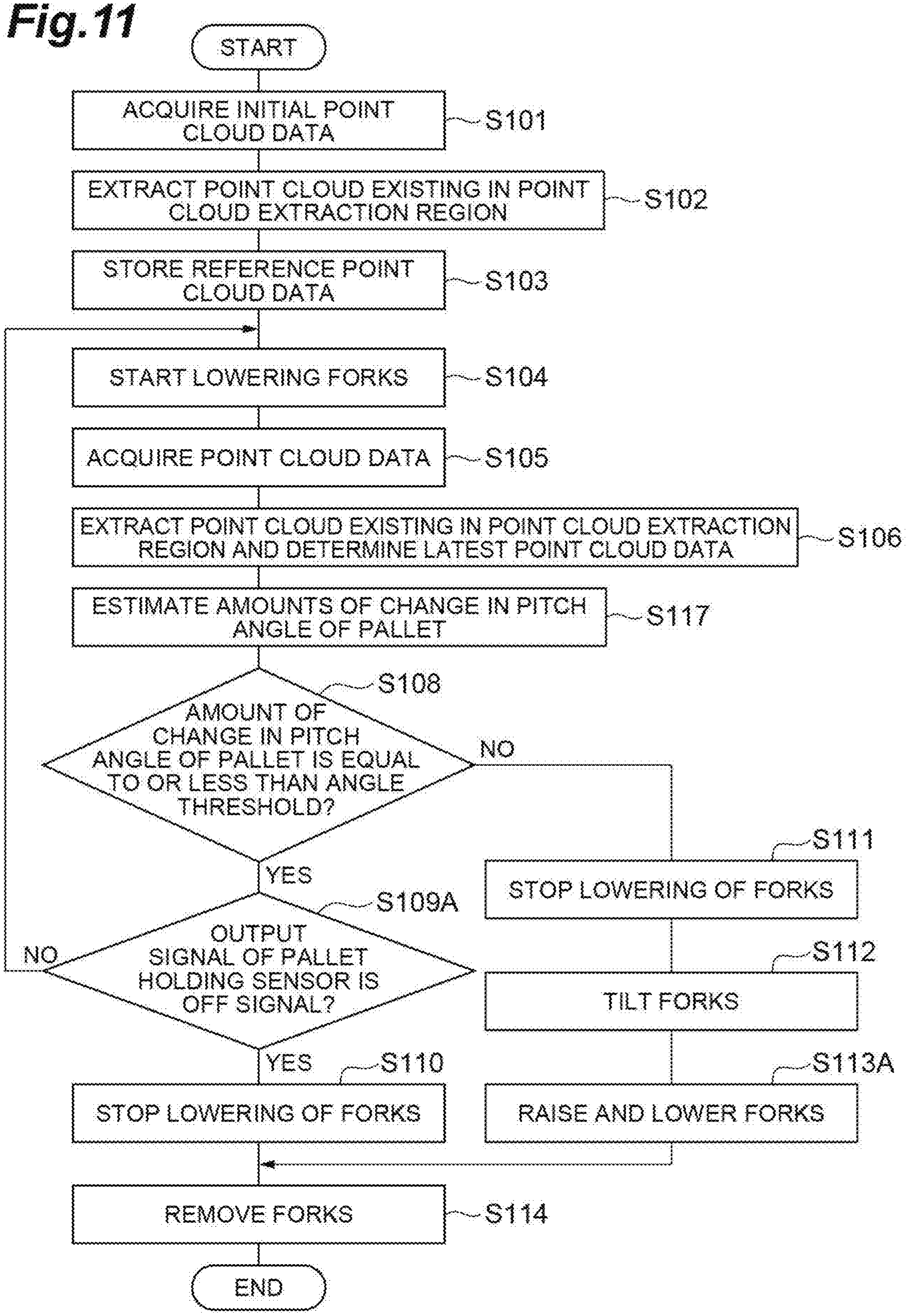
FIG. 11 is a flowchart indicating procedure of unloading control processing to be executed by a controller illustrated in FIG. 10.

FIG. 11 is a flowchart indicating procedure of unloading control processing to be executed by the controller 30A, and corresponds to FIG. 4. In FIG. 11, the controller 30A executes steps S101 to S106 described above.

After executing step S106, the controller 30A estimates the amounts of change in the pitch angle of the pallet 11 with respect to the forks 12 based on the latest point cloud data determined in step S106, the reference point cloud data stored in step S103, and the detected values of the tilt angle sensor 21 (step S117). The controller 30A extracts the difference between the latest point cloud data and the reference point cloud data to estimate the amount of change in the pitch angle of the pallet 11 with respect to the forks 12.

Subsequently, the controller 30A executes step S108 described above. When determining that the amount of change in the pitch angle of the pallet 11 with respect to the forks 12 is equal to or less than the angle threshold, the controller 30A determines whether or not the output signal of the pallet holding sensor 27 is an OFF signal (step S109A).

When determining that the output signal of the pallet holding sensor 27 is not the OFF signal but the ON signal, the controller 30A executes the above step S104 again. When determining that the output signal of the pallet holding sensor 27 is the OFF signal, the controller 30A executes the above step S110.

When determining that the amount of change in the pitch angle of the pallet 11 with respect to the forks 12 is not equal to or less than the angle threshold in step S108, the controller 30A executes the above-described steps S111 and S112.

In addition, the controller 30A controls the lift cylinder 23 to raise and lower the forks 12 to a height position at which the claw portion 18 of the forks 12 does not contact the inner wall surface of the pallet 11 based on the output signal of the pallet holding sensor 27 (step S113A). That is, the controller 30A controls the lift cylinder 23 so as to raise and lower the forks 12 until the output signal of the pallet holding sensor 27 becomes the OFF signal. Note that the steps S112 and S113A may be executed simultaneously.

The controller 30A executes step S114 after executing step S110 or step S113A.

Here, the point cloud extraction unit 31 executes steps S101, S102, S105, and S106. The reference point cloud data storage unit 32 executes step S103. The lowering control unit 33 executes steps S104, S110, and S111. The posture change amount estimation unit 39 executes step S117. The pallet abutment determination unit 35A executes steps S108, and S109A. The tilting control unit 36 executes step S112. The lifting control unit 37A executes step S113A. The withdrawing control unit 38 executes step S114.

As described above, in the present embodiment, it is determined whether or not the pallet 11 held by the forks 12 abuts on the upper surface 16*a* of the cargo bed 16 based on the amount of change in the posture of the pallet 11 with respect to the forks 12 and the detection result as to whether or not the pallet 11 is held by the forks 12. When the pallet 11 abuts on the upper surface 16*a* of the cargo bed 16 inclined in the pitch direction, the posture of the pallet 11 with respect to the forks 12 changes in a state where the pallet 11 is held by the forks 12. When the pallet 11 abuts on the upper surface 16*a* of the cargo bed 16 that is not inclined, the pallet 11 becomes in a state of not being held by the forks 12, but the posture of the pallet 11 with respect to the forks 12 does not change. Therefore, when the pallet 11 abuts on the upper surface 16*a* of the cargo bed 16 inclined in the pitch direction, since the pallet 11 is inclined following the inclination of the cargo bed 16, the forks 12 are tilted in a direction approaching parallel to the main surface 11*b* of the pallet 11. When the pallet 11 abuts on the upper surface 16*a* of the cargo bed 16 that is not inclined, the forks 12 are not necessarily tilted.

In addition, in the present embodiment, when the amount of change in the posture of the pallet 11 with respect to the forks 12 is larger than the angle threshold, it is determined that the pallet 11 abuts on the upper surface 16*a* of the cargo bed 16 inclined in the pitch direction, and the forks 12 tilt in a direction approaching parallel to the main surface 11*b* of the pallet 11. When the amount of change in the posture of the pallet 11 with respect to the forks 12 is equal to or smaller than the angle threshold and the pallet 11 is in a state of not being held by the forks 12, it is determined that the pallet 11 abuts on the upper surface 16*a* of the cargo bed 16 that is not inclined, and the forks 12 do not tilt.

Furthermore, in the present embodiment, by using the pallet holding sensor 27 that detects whether or not the pallet 11 is held by the forks 12, it is possible to accurately detect whether or not the forks 12 are in a state of being in contact with the pallet 11 even when an estimation error occurs in the height position of the pallet 11 with respect to the forks 12 depending on the mounting position of the RGBD camera 20.

Note that the present invention is not limited to the above embodiment. For example, in the above embodiment, there is provided with the lifting control units 37 and 37A that control the lift cylinders 23 so as to raise and lower the forks 12 in a direction in which the forks 12 do not come into contact with the inner wall surface of the pallet 11 when the pallet 11 held by the forks 12 abuts on the upper surface 16*a* of the cargo bed 16. However, in a case where the forks 12 do not come into contact with the inner wall surface of the pallet 11 when it is determined that the pallet 11 held by the forks 12 abuts on the upper surface 16*a* of the cargo bed 16, the lifting control units 37 and 37A may be omitted.

Furthermore, in the above embodiment, the reference point cloud data is set based on the initial point cloud data first acquired by the RGBD camera 20 at the start of lowering of the forks 12 holding the pallet 11, but the present invention is not particularly limited to such a form. For example, the point cloud data acquired by the RGBD camera 20 may be corrected as new reference point cloud data during lowering of the forks 12 holding the pallet 11.

Furthermore, in the above-described embodiment, the pallet 11 held by the forks 12 is imaged by the RGBD camera 20, and the three-dimensional point cloud of the pallet 11 is acquired. However, the present invention is not particularly limited to the RGBD camera 20, and the three-dimensional point cloud of the pallet 11 may be acquired using, for example, a time of flight (ToF) camera, light detection and ranging (LIDAR), or the like. Furthermore, a plurality of RGBD cameras 20 or the like may be provided instead of one, and the three-dimensional point cloud of the pallet 11 may be acquired using the point cloud data combined by the plurality of RGBD cameras 20 or the like.

Furthermore, in the embodiment described above, the amount of change in the posture of the pallet 11 with respect to the forks 12 is estimated by collating the latest point cloud data with the reference point cloud data when the forks 12 holding the pallet 11 are lowered, but the present invention is not particularly limited to such a form. For example, the amount of change in the posture of the pallet 11 with respect to the forks 12 may be estimated by acquiring the image data of the pallet 11 held by the forks 12 and collating the latest image data with the reference image data.

Further, in the above embodiment, unloading is performed on the cargo bed 16 which tends to be inclined in the pitch direction by applying the suspension of the truck 15. However, the present invention is not particularly limited to the cargo bed 16 of the truck 15, and unloading may be performed on a loading portion inclined in the pitch direction.

In the above embodiment, unloading is performed by the reach-type forklift, but the present invention is not particularly limited thereto, and unloading may be performed by a counter-type forklift. In this case, the forklift is retracted to remove the forks 12 from the pallet 11.

REFERENCE SIGNS LIST

- 1, 1A UNLOADING CONTROL DEVICE
- 2 FORKLIFT
- 11 PALLET
- 11*b* MAIN SURFACE
- 12 FORKS
- 16 CARGO BED (LOADING PORTION)
- 16*a* UPPER SURFACE
- 20 RGBD CAMERA (PALLET DETECTION UNIT)
- 21 TILT ANGLE SENSOR (TILT ANGLE DETECTOR)
- 22 LIFT SENSOR (HEIGHT POSITION DETECTOR)
- 23 LIFT CYLINDER
- 24 TILT CYLINDER
- 27 PALLET HOLDING SENSOR (PALLET HOLDING DETECTOR)
- 31 POINT CLOUD EXTRACTION UNIT (PALLET DETECTION UNIT)
- 33 LOWERING CONTROL UNIT
- 34 POSITION/POSTURE CHANGE AMOUNT ESTIMATION UNIT (CHANGE AMOUNT ESTIMATION UNIT)
- 35, 35A PALLET ABUTMENT DETERMINATION UNIT (DETERMINATION UNIT)
- 36 TILTING CONTROL UNIT
- 38 WITHDRAWING CONTROL UNIT
- 39 POSTURE CHANGE AMOUNT ESTIMATION UNIT (CHANGE AMOUNT ESTIMATION UNIT)

What is claimed is:

1. An unloading control device for loading a pallet held by forks of a forklift onto a loading portion to remove the forks from the pallet, the unloading control device comprising:

a pallet detection unit configured to detect the pallet held by the forks and acquire detection data of the pallet;

a tilt angle detector configured to detect a tilt angle of the forks;

a lowering control unit configured to control a lift cylinder of the forklift so as to lower the forks holding the pallet toward the loading portion;

a change amount estimation unit configured to estimate a change amount of a posture of the pallet with respect to the forks based on the detection data of the pallet acquired by the pallet detection unit and the tilt angle of the forks detected by the tilt angle detector when the forks holding the pallet are lowered;

a determination unit configured to determine whether or not the pallet held by the forks abuts on an upper surface of the loading portion based on the change amount of the posture of the pallet with respect to the forks estimated by the change amount estimation unit;

a tilting control unit configured to control a tilt cylinder of the forklift so that the forks tilt in a direction approaching parallel to a main surface of the pallet when the determination unit determines that the pallet held by the forks abuts on an upper surface of the loading portion; and a withdrawing control unit configured to control the forklift so as to remove the forks from the pallet according to the tilt angle of the forks detected by the tilt angle detector after the forks approach parallel to the main surface of the pallet.

2. The unloading control device according to claim 1, wherein the pallet detection unit acquires point cloud data of the pallet in three dimensions, and when the forks holding the pallet are lowered, the change amount estimation unit collates latest point cloud data of the pallet acquired by the pallet detection unit with reference point cloud data of the pallet acquired before the latest point cloud data by the pallet detection unit to estimate a change amount of a posture of the pallet with respect to the forks.

3. The unloading control device according to claim 1, further comprising a height position detector configured to detect a height position of the forks, wherein the change amount estimation unit estimates a change amount of a height position and a posture of the pallet with respect to the forks based on detection data of the pallet acquired by the pallet detection unit, a height position of the forks detected by the height position detector, and a tilt angle of the forks detected by the tilt angle detector when the forks holding the pallet are lowered, and the determination unit determines whether the pallet held by the forks abuts on an upper surface of the loading portion based on the change amount of the height position and the posture of the pallet with respect to the forks estimated by the change amount estimation unit.

4. The unloading control device according to claim 3, wherein the determination unit determines that the pallet held by the forks abuts on the upper surface of the loading portion when the change amount of the posture of the pallet with respect to the forks is larger than a first threshold, and determines that the pallet held by the forks abuts on the upper surface of the loading portion when the change amount of the posture of the pallet with respect to the forks is equal to or smaller than the first threshold and a change amount of a height position of the pallet with respect to the forks is equal to or larger than a second threshold, and the tilting control unit controls the tilt cylinder such that the forks tilt in a direction approaching parallel to a main surface of the pallet when the change amount of the posture of the pallet with respect to the forks is larger than the first threshold.

5. The unloading control device according to claim 1, further comprising a pallet holding detector configured to detect whether or not the pallet is held by the forks, wherein the determination unit determines whether or not the pallet held by the forks abuts on an upper surface of the loading portion based on the change amount of the posture of the pallet with respect to the forks estimated by the change amount estimation unit and a detection result of the pallet holding detector.

6. The unloading control device according to claim 5, wherein the determination unit determines that the pallet held by the forks abuts on the upper surface of the loading portion when the change amount of the posture of the pallet with respect to the forks is larger than a threshold, and determines that the pallet held by the forks abuts on the upper surface of the loading portion when the change amount of the posture of the pallet with respect to the forks is equal to or smaller than the threshold and the pallet holding detector detects that the pallet is not held by the forks, and the tilting control unit controls the tilt cylinder such that the forks tilt in a direction approaching parallel to a main surface of the pallet when the change amount of the posture of the pallet with respect to the forks is larger than the threshold.

* * * * *